United States Patent
Carr et al.

(10) Patent No.: US 10,301,032 B2
(45) Date of Patent: May 28, 2019

(54) FUEL CELL CUSHIONS FOR AN AIRCRAFT FUEL SYSTEM

(71) Applicant: Bell Helicopter Textron Inc., Fort Worth, TX (US)

(72) Inventors: Timothy Brian Carr, Fort Worth, TX (US); Suvankar Mishra, Fort Worth, TX (US); Michael Stephen Deslatte, Fort Worth, TX (US); Michael Douglas Ishmael, Fort Worth, TX (US); Ronald James Turner, Fort Worth, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 349 days.

(21) Appl. No.: 15/444,085

(22) Filed: Feb. 27, 2017

(65) Prior Publication Data

US 2018/0244397 A1    Aug. 30, 2018

(51) Int. Cl.
*B64D 37/00* (2006.01)
*B64D 37/06* (2006.01)
*B05D 1/02* (2006.01)
*B64D 37/02* (2006.01)

(52) U.S. Cl.
CPC ............ *B64D 37/005* (2013.01); *B05D 1/02* (2013.01); *B64D 37/02* (2013.01); *B64D 37/06* (2013.01)

(58) Field of Classification Search
CPC ...... B64D 37/005; B64D 37/02; B64D 37/06; B05D 1/02
See application file for complete search history.

(56) References Cited

U.S. PATENT DOCUMENTS

| | | | |
|---|---|---|---|
| 3,224,623 A | 12/1965 | Knox et al. | |
| 5,451,015 A | 9/1995 | Cronkhite et al. | |
| 6,176,452 B1* | 1/2001 | Gallegos | B60K 15/00 244/135 B |
| 7,959,983 B1* | 6/2011 | Farrar | B05B 5/032 427/422 |
| 2005/0089661 A1* | 4/2005 | Hogenson | B64D 37/06 428/36.5 |
| 2008/0085371 A1* | 4/2008 | Gudlavalleti | C23C 4/12 427/446 |
| 2014/0144917 A1 | 5/2014 | Meillat et al. | |
| 2016/0307555 A1* | 10/2016 | Demo | B05D 1/02 |
| 2017/0043879 A1 | 2/2017 | Perry et al. | |

OTHER PUBLICATIONS

European Search Report, Application No. 17211215.3, European Patent Office, dated Mar. 3, 2018.

* cited by examiner

*Primary Examiner* — Valentina Xavier
(74) *Attorney, Agent, or Firm* — Lawrence Youst PLLC

(57) ABSTRACT

An aircraft fuel system includes one or more fuel cells adapted to contain fuel, a fuel cell receiving assembly having an inner surface adapted to receive the one or more fuel cells and a fuel cell cushion disposed between the inner surface of the fuel cell receiving assembly and the one or more fuel cells. The fuel cell cushion is machined from a foam substrate to form a shaped foam substrate that is substantially covered with a cushion coating. The cushion coating is sprayable onto the shaped foam substrate such that the fuel cell cushion is substantially nonabsorbent of fuel. The fuel cell cushion is interposable between the inner surface of the fuel cell receiving assembly and the one or more fuel cells to cushion the one or more fuel cells from damage.

20 Claims, 6 Drawing Sheets

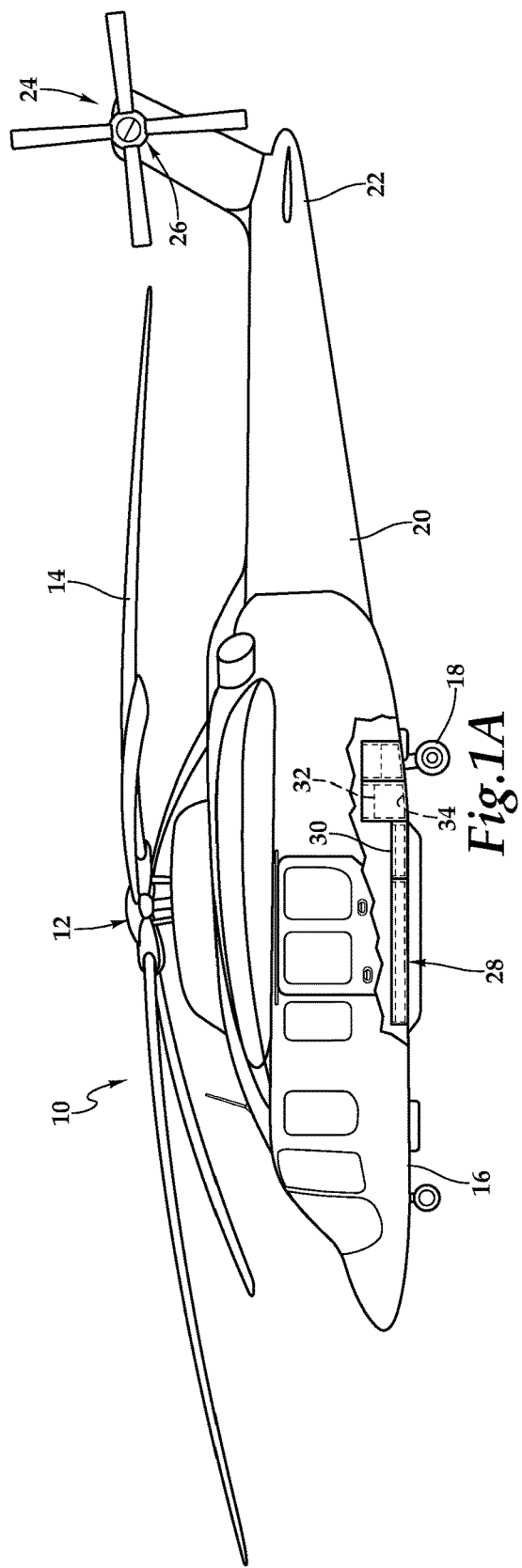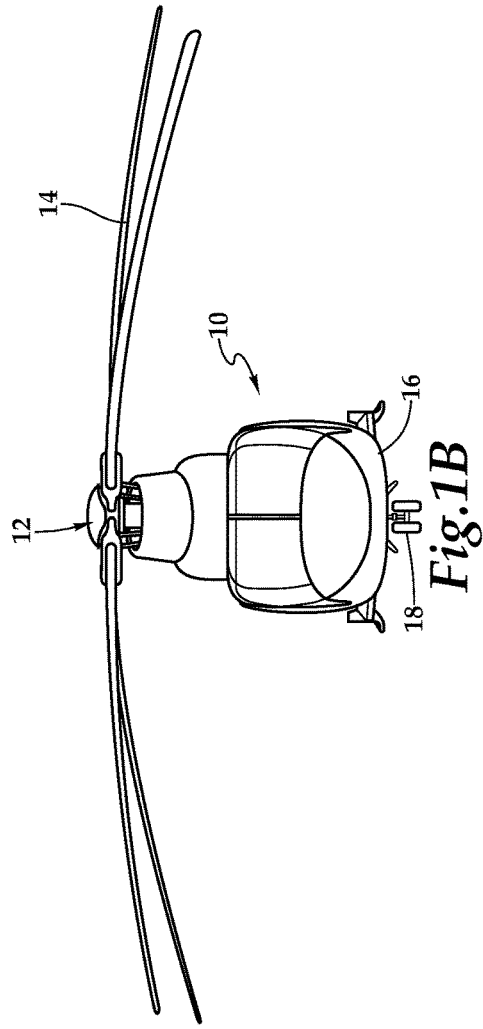

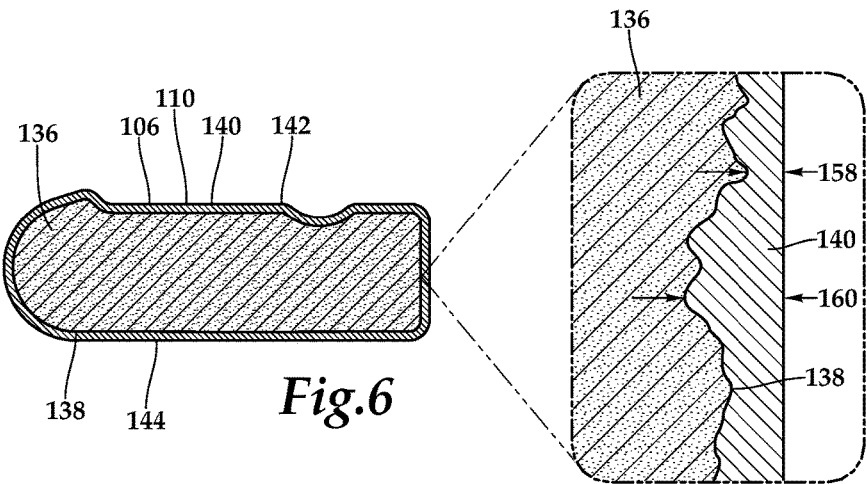
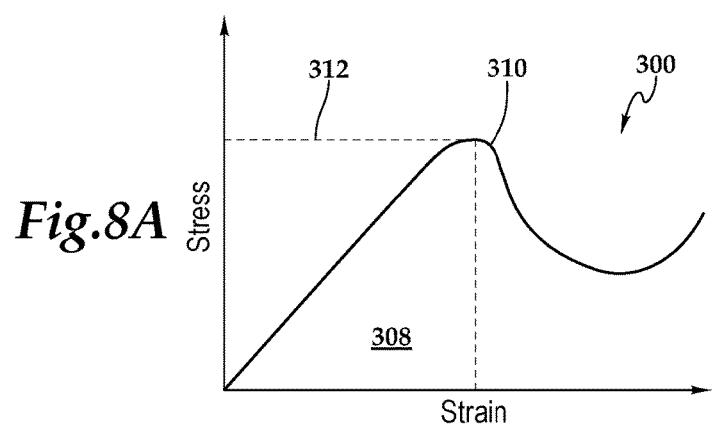
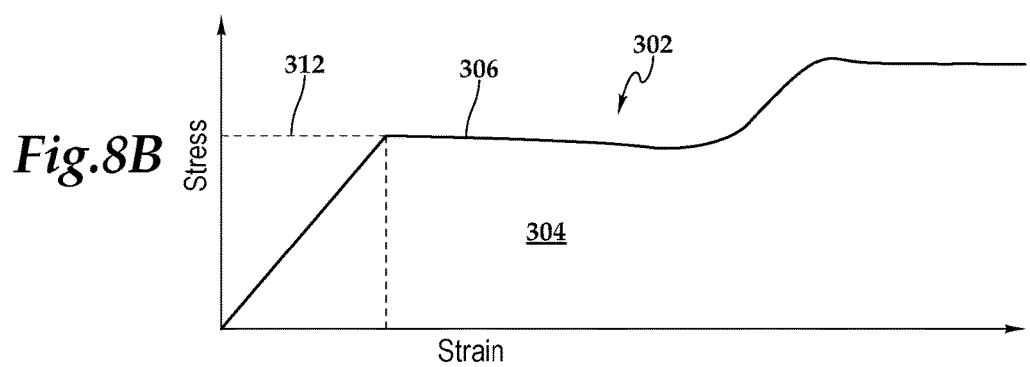

FUEL CELL CUSHIONS FOR AN AIRCRAFT FUEL SYSTEM

TECHNICAL FIELD OF THE DISCLOSURE

The present disclosure relates, in general, to fuel cell cushions for an aircraft fuel system and, in particular, to fuel cell cushions to protect fuel cells in an aircraft fuel system from damage caused by protrusions, crashes or other hazards.

BACKGROUND

The United States Federal Aviation Administration (FAA) establishes airworthiness standards for aircraft such as airplanes and rotorcraft and certifies that aircraft, aircraft engines, propellers and related articles conform to an approved design and are in a condition for safe operation. In one example, part 29 of the FAA regulations is directed to airworthiness standards for transport rotorcraft, which includes section 29.967 directed to fuel tank installation and the structural support thereof. Section 29.967 requires the fuel system to include cushions, or padding, to minimize wear, chafing or other damage to the fuel tank over the life of the rotorcraft and during a crash. Section 29.967 also requires that the cushions be nonabsorbent or treated to prevent the absorption of fuel, thus minimizing the risk of fire in case of a fuel tank leak. Current aircraft fuel system padding utilizes materials that are heavy and which require a burdensome application of sealant or wrapping to meet the nonabsorbent requirements of the FAA regulations. Accordingly, a need has arisen for fuel cell cushions meeting the strength and nonabsorbent standards for fuel cell supports, but which are lighter, easier to produce and provide other advantages.

SUMMARY

In a first aspect, the present disclosure is directed to an aircraft fuel system including one or more fuel cells adapted to contain fuel, a fuel cell receiving assembly having an inner surface adapted to receive the one or more fuel cells, a shaped foam substrate machined from a foam substrate to fit between the inner surface of the fuel cell receiving assembly and the one or more fuel cells and a cushion coating substantially covering the shaped foam substrate to form a fuel cell cushion. The cushion coating is sprayable onto the shaped foam substrate such that the fuel cell cushion is substantially nonabsorbent of fuel. The fuel cell cushion is interposable between the inner surface of the fuel cell receiving assembly and the one or more fuel cells to cushion the one or more fuel cells from damage.

In some embodiments, the inner surface of the fuel cell receiving assembly may include a floor and a wall and the fuel cell cushion may include a plurality of fuel cell cushions including a floor fuel cell cushion and a wall fuel cell cushion. In such embodiments, the floor fuel cell cushion may be disposed on the floor of the fuel cell receiving assembly and the wall fuel cell cushion may be disposed on the wall of the fuel cell receiving assembly. In certain embodiments, the shaped foam substrate of the floor fuel cell cushion may have a higher compression strength and a higher density than the shaped foam substrate of the wall fuel cell cushion. In some embodiments, the wall of the fuel cell receiving assembly may include at least one protrusion and the wall fuel cell cushion may at least partially cover the at least one protrusion to cushion the one or more fuel cells from damage from the at least one protrusion. In certain embodiments, the floor of the fuel cell receiving assembly may include an edge at least partially surrounding a middle portion and the floor fuel cell cushion may be tapered from increasing to decreasing thickness from the edge of the floor to the middle portion of the floor to bias the fuel in the one or more fuel cells to flow toward the middle portion of the floor.

In some embodiments, the foam substrate may include polyvinyl chloride, have a compression strength between about 300 and about 500 pounds per square inch or greater, have a density of between about 5 and about 10 pounds per cubic foot and/or include substantially closed cell foam. In certain embodiments, the foam substrate may be machined to expose a shaped foam substrate surface having open cells and the cushion coating may substantially fill the open cells. In some embodiments, the fuel cell cushion may have a plurality of surfaces including first and second surfaces, the first surface may be machinably shaped to abut the one or more fuel cells and the second surface may be machinably shaped to abut the inner surface of the fuel cell receiving assembly. In certain embodiments, the cushion coating may include polyurethane and/or have a thickness of between about 0.005 and about 0.01 inches. In some embodiments, the cushion coating may include a plurality of layers. In certain embodiments, the plurality of layers may include a first layer contacting the shaped foam substrate and the first layer may include a thinned cushion coating. In some embodiments, the thinned cushion coating may include polyurethane and xylene. In such embodiments, the thinned cushion coating may have an approximately 2:1 ratio of polyurethane to xylene.

In a second aspect, the present disclosure is directed to an aircraft including a fuselage and a fuel cell receiving assembly coupled to the fuselage. The fuel cell receiving assembly has an inner surface. The aircraft also includes one or more fuel cells adapted to contain fuel. The fuel cell receiving assembly is adapted to receive the one or more fuel cells. The aircraft also includes a shaped foam substrate machined from a foam substrate to fit between the inner surface of the fuel cell receiving assembly and the one or more fuel cells and a cushion coating substantially covering the shaped foam substrate to form a fuel cell cushion. The cushion coating is sprayable onto the shaped foam substrate such that the fuel cell cushion is substantially nonabsorbent of fuel. The fuel cell cushion is interposable between the inner surface of the fuel cell receiving assembly and the one or more fuel cells to cushion the one or more fuel cells from damage.

In some embodiments, the one or more fuel cells may include one or more fuel bags. In certain embodiments, the inner surface of the fuel cell receiving assembly may form a plurality of compartments, the one or more fuel cells may include a plurality of fuel cells and each of the plurality of compartments may be adapted to receive at least one of the plurality of fuel cells. In some embodiments, the one or more fuel cells may include a plurality of fuel cells including first and second fuel cells and the aircraft may include a fluid interconnection line coupled to the first and second fuel cells to provide fluid communication between the first and second fuel cells. In such embodiments, the first and second fuel cells may be separated by a wall forming an aperture having a rim, the fluid interconnection line may pass through the aperture and the fuel cell cushion may provide support underneath the first and second fuel cells to prevent severing of the fluid interconnection line by the rim of the aperture.

In a third aspect, the present disclosure is directed to a method of manufacturing a fuel cell cushion for an aircraft fuel system. The method includes providing a foam substrate; machining the foam substrate to fit between a fuel cell receiving assembly and one or more fuel cells to form a shaped foam substrate having a surface; and spraying the surface of the shaped foam substrate with a cushion coating to form the fuel cell cushion, the fuel cell cushion substantially nonabsorbent of fuel, the fuel cell cushion interposable between the fuel cell receiving assembly and the one or more fuel cells to cushion the one or more fuel cells from damage.

In some embodiments, spraying the surface of the shaped foam substrate with the cushion coating to form the fuel cell cushion may include spraying a plurality of layers of the cushion coating onto the surface of the shaped foam substrate. In certain embodiments, spraying the plurality of layers of the cushion coating onto the surface of the shaped foam substrate may include spraying a first, bottommost layer of thinned cushion coating onto the surface of the shaped foam substrate. The method may include thinning the cushion coating up to 50 percent using a thinning agent to form the thinned cushion coating.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIGS. 1A-1B are schematic illustrations of an exemplary rotorcraft with a fuel system in accordance with embodiments of the present disclosure;

FIG. 6 is a cross-sectional view of a floor fuel cell cushion in accordance with embodiments of the present disclosure;

FIGS. 8A-8B are graphs comparing the energy absorption capabilities of fuel cell cushions with and without cushion coatings in accordance with embodiments of the present disclosure.

DETAILED DESCRIPTION

Figure 2A:
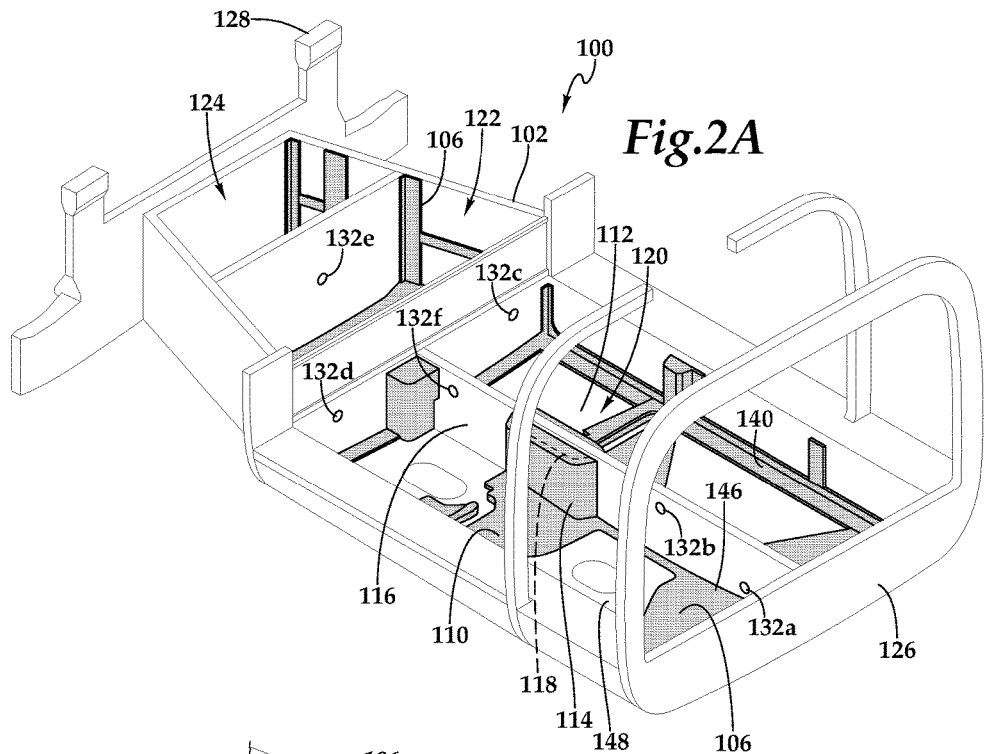
FIGS. 2A-2B are isometric views of a fuel cell receiving assembly utilizing fuel cell cushions in accordance with embodiments of the present disclosure.
Figure 2B:
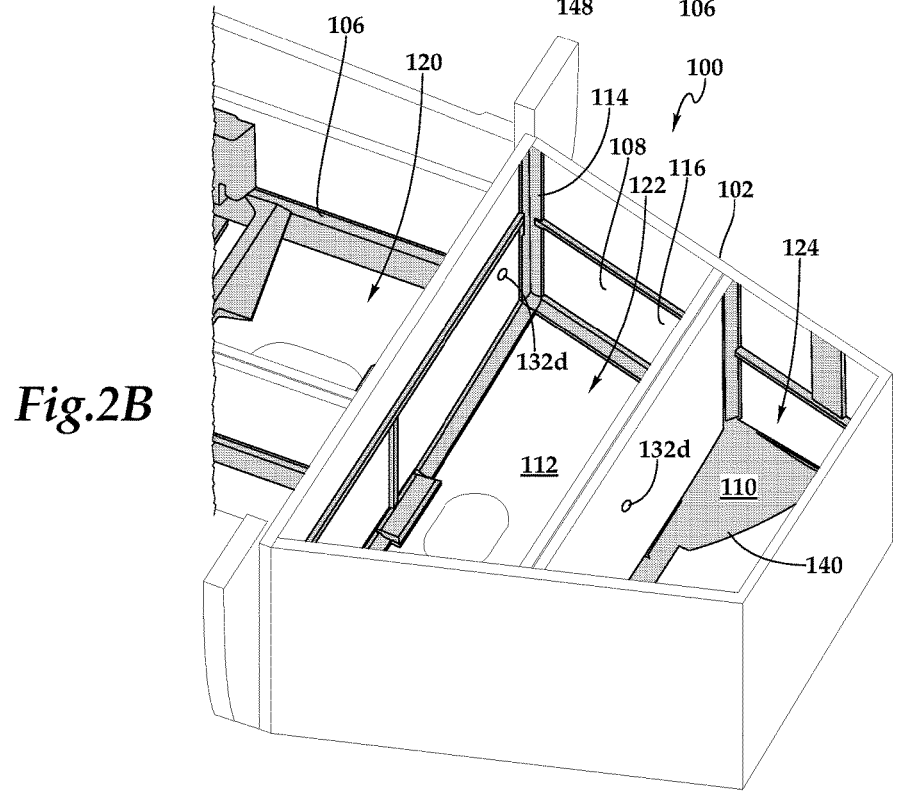

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction.

Referring to FIGS. 1A-1B the drawings, a rotorcraft is schematically illustrated and generally designated 10. Rotorcraft 10 has a rotor hub assembly 12, which includes a plurality of rotor blade assemblies 14. Rotor hub assembly 12 is rotatable relative to a fuselage 16 of rotorcraft 10. The pitch of rotor blade assemblies 14 can be collectively and/or cyclically manipulated to selectively control direction, thrust and lift of rotorcraft 10. A landing gear system 18 provides ground support for rotorcraft 10. A tailboom 20, having an aft portion 22, extends from fuselage 16. A tail rotor 24 includes a tail rotor hub assembly 26 that is rotatably coupled to aft portion 22 of tailboom 20. As used herein, the term "coupled" may include direct or indirect coupling by any means, including moving and/or non-moving mechanical connections.

Rotorcraft 10 has a fuel system 28, including a fuel cell receiving assembly 30 located in a lower portion of fuselage 16. Fuel cell receiving assembly 30 is coupled to fuselage 16 and may be fully or partially integral with fuselage 16 or may be independent of but secured to fuselage 16. Fuel cell receiving assembly 30 contains or receives one or more fuel cells 32, such as fuel bags, each of which contain fuel. The fuel contained in fuel cells 32 is used as an energy source to power the various systems of rotorcraft 10, such as rotor hub assembly 12 and tail rotor hub assembly 26. The inner surface of fuel cell receiving assembly 30 includes one or more fuel cell cushions 34 interposed between fuel cells 32 and the inner surface of fuel cell receiving assembly 30 to provide a smooth, stable and non-damaging surface on which fuel cells 32 may rest. Fuel cell cushions 34 prevent protruding structures, such as fasteners, or other wear items from puncturing fuel cells 32 during a crash or wearing down or weakening fuel cells 32 over time. Fuel cell cushions 34 are also coated to prevent the absorption of fuel, thereby decreasing the risk of a fire. Thus, fuel cell cushions 34 protect the structural integrity of fuel cells 32 while resisting the absorption of fuel.

It should be appreciated that rotorcraft 10 is merely illustrative of a variety of aircraft that can implement the embodiments disclosed herein. Indeed, fuel system 28, including fuel cell cushions 34, may be utilized on any aircraft that uses fuel as an energy source. Other aircraft implementations can include hybrid aircraft, tiltrotor aircraft, tiltwing aircraft, quad tiltrotor aircraft, unmanned aircraft, gyrocopters, airplanes, jets and the like. As such, those skilled in the art will recognize that fuel cell cushions 34 can be integrated into a variety of aircraft configurations. It should be appreciated that even though aircraft are particularly well-suited to implement the embodiments of the present disclosure, non-aircraft vehicles and devices can also implement the embodiments.

Referring to FIGS. 2A-2B, 3A-3B, 4A-4C, 5A-5C and 6 in the drawings, a fuel system for an aircraft is schematically illustrated and generally designated 100. Fuel system 100 includes a fuel cell receiving assembly 102 that receives or contains fuel cells 104. Fuel cells 104 contain fuel. Fuel cell cushions 106 are interposed between inner surface 108 of fuel cell receiving assembly 102 and fuel cells 104. Fuel cell cushions 106 include floor fuel cell cushions 110, which are disposed on a floor 112 of inner surface 108. Fuel cell cushions 106 also include wall fuel cell cushions 114, which are disposed on walls 116 of inner surface 108. Fuel cell cushions 106 at least partially surround fuel cells 104 to cushion, or protect, fuel cells 104 from damage caused by protrusions 118 in fuel cell receiving assembly 102 and from other hazards. Fuel cell cushions 106 support the weight of fuel cells 104 to minimize the displacement of fuel cells 104 and resist fuel absorption in case of a fuel leak. Fuel cell cushions 106 may also be tapered or shaped to bias, or direct, the flow of fuel within fuel cells 104 in a particular direction, such as toward an outlet or fuel pump.

Fuel cell receiving assembly 102 includes multiple compartments, including a forward compartment 120, a middle compartment 122 and an aft compartment 124. Fuel cell receiving assembly 102, including floor 112, walls 116, bulkheads 126, 128 and any supporting airframe structure, may be formed from a metal, such as aluminum, composite or other suitable material. It should be understood by those of ordinary skill in the art that fuel cell receiving assembly 102 may be constructed in any number of different manners including, but not limited to, as a single unitary assembly, as multiple unitary subassemblies such as a front subassembly, a middle subassembly and an aft subassembly, or in another suitable manner. Likewise, portions of fuel cell receiving assembly 102 could alternatively be formed by sections of keel beams connected to or integral with the fuselage of an aircraft, such as a pair of side keel beams and a central keel beam each of which extend in the longitudinal direction of fuel cell receiving assembly 102. Regardless of the specific manner of construction, important features of fuel cell receiving assembly 102 include being sized and shaped to operably receive and contain fuel cells 104 therein.

Figure 3A:
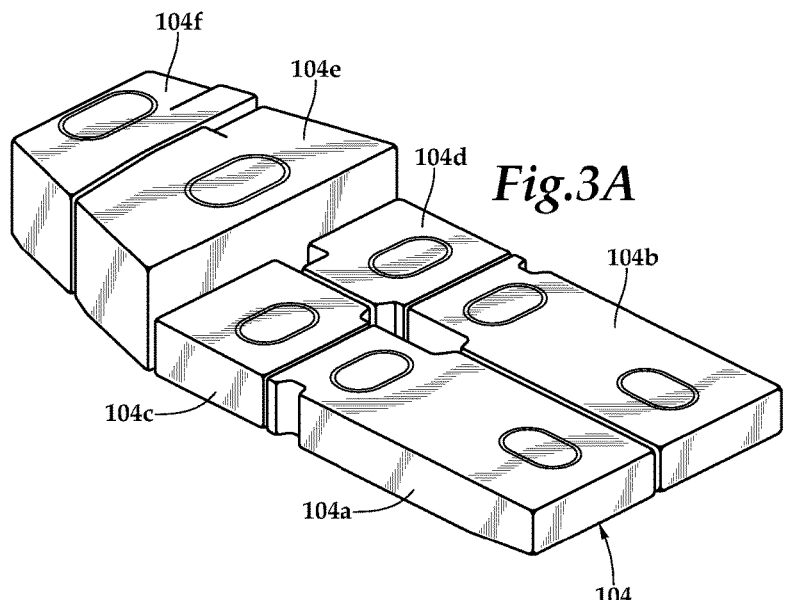
FIGS. 3A-3B are various views of fuel cells for an aircraft in accordance with embodiments of the present disclosure.
Figure 3B:
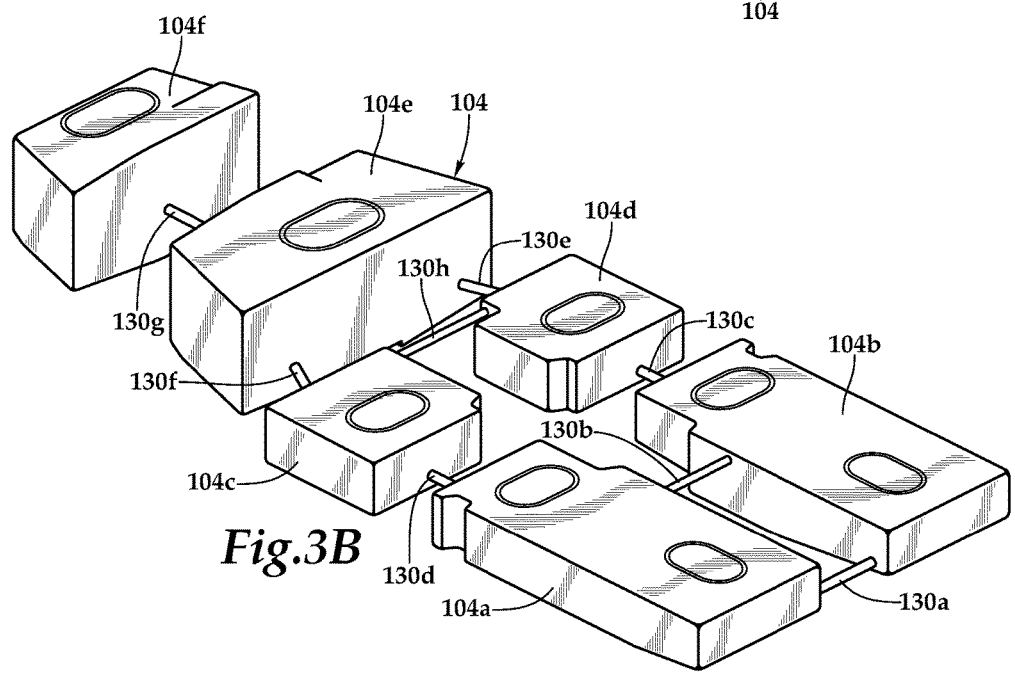

As shown in FIGS. 3A and 3B, fuel cells 104 include six interconnected fuel cells including forward cells 104a, 104b, feed cells 104c, 104d, mid cell 104e and aft cell 104f. As illustrated, the height of mid cell 104e and aft cell 104f is greater than that of forward cells 104a, 104b and feed cells 104c, 104d. The volume of fuel that may be stored in fuel cells 104 will depend on the particular implementation but will typically be on the order of several hundred to a thousand gallons. Compartments 120, 122, 124 of fuel cell receiving assembly 102 are each adapted to receive at least one of fuel cells 104. As illustrated, forward compartment 120 of fuel cell receiving assembly 102 receives forward cells 104a, 104b and feed cells 104c, 104d, middle compartment 122 of fuel cell receiving assembly 102 receives mid cell 104e and aft compartment 124 receives aft cell 104f. Even though fuel cells 104 have been described as having a particular number of fuel cells in a particular configuration, it should be understood by those of ordinary skill in the art that fuel cells 104 may have any number of fuel cells both less than or greater than six and fuel cells 104 may be arranged in any manner of different configurations depending upon the particular implementation. Likewise, fuel cell receiving assembly 102 may include any number of compartments to receive fuel cells 104. For example, fuel cell receiving assembly 102 may include one, two, eight or any other number of compartments.

As best seen in the exploded view of FIG. 3B, fuel cells 104 include one or more fluid interconnection lines 130a-130h, each of which may be coupled to any two of fuel cells 104 to provide fluid communication therebetween. As illustrated, two fluid interconnection lines 130a, 130b establish fluid communication between forward cells 104a, 104b. Preferably, fluid interconnection line 130a is operable to communicate a liquid, such as fuel, between forward cells 104a, 104b while fluid interconnection line 130b is a vent line operable to communicate a gas, such as air, between forward cells 104a, 104b. Also illustrated is fluid interconnection line 130c that establishes fluid communication between forward cell 104b and feed cell 104d, fluid interconnection line 130d that establishes fluid communication between forward cell 104a and feed cell 104c, fluid interconnection line 130e that establishes fluid communication between feed cell 104d and mid cell 104e, fluid interconnection line 130f that establishes fluid communication between feed cell 104c and mid cell 104e, fluid interconnection line 130g that establishes fluid communication between mid cell 104e and aft cell 104f and fluid interconnection line 130h that establishes fluid communication between feed cell 104c and feed cell 104d. Fluid interconnection lines 130c, 130d, 130e, 130f, 130g are preferably operable to communicate liquids while fluid interconnection line 130h is preferably a vent line operable to communicate a gas.

Some of fluid interconnection lines 130a-130h pass through apertures 132a-132f formed by walls 116 of fuel cell receiving assembly 102. As illustrated, fluid interconnection line 130a passes through aperture 132a, fluid interconnection line 130b passes through aperture 132b, fluid interconnection line 130e passes through aperture 132c, fluid interconnection line 130f passes through aperture 132d, fluid interconnection line 130g passes through aperture 132e and fluid interconnection line 130h passes through aperture 132f. During a crash impact or otherwise, none of fluid interconnection lines 130a-130h can become severed or separated from fuel cells 104 as this could result in fuel exiting fuel cells 104 and potentially igniting. Fuel cells 104 may be bags or bladders that are flexible, semi-rigid or rigid. In one non-limiting example, fuel cells 104 may be formed from Kevlar, among other materials. In other embodiments, fuel cells 104 may be tanks formed from a rigid material, such as metal, polymer, plastic or any other rigid material.

Figure 4A:
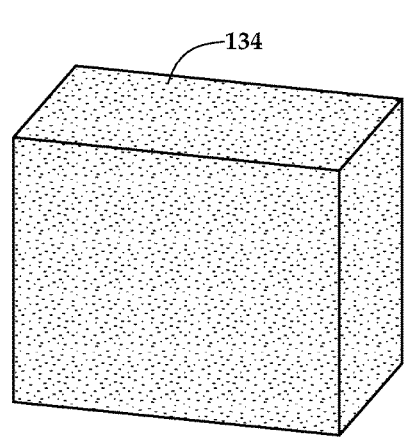
FIGS. 4A-4C are various views of the components of a floor fuel cell cushion in accordance with embodiments of the present disclosure.
Figure 4B:
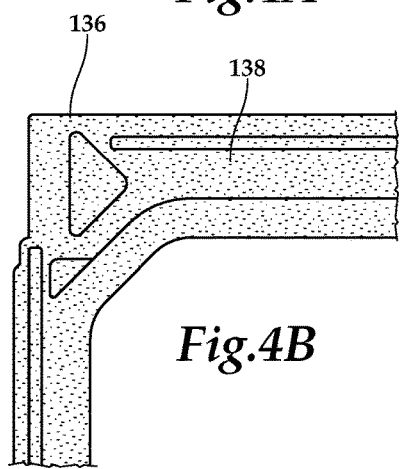
Figure 4C:
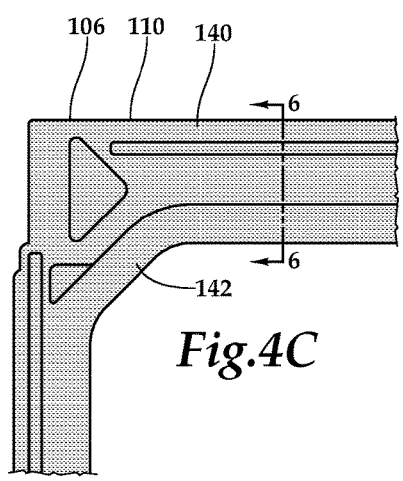

FIGS. 4A-4C illustrate the various stages and materials used in the formation of one of floor fuel cell cushions 110. The manufacture of each floor fuel cell cushion 110 may begin with a foam substrate 134. Foam substrate 134 is formed from closed cell foam with adequate compression strength to withstand the loading of fuel cells 104 in flight, as floor fuel cell cushions 110 are underneath and bear the weight of fuel cells 104. Foam substrate 134 may also be blown to create the porosity therein. Foam substrate 134 may be a fine cell compressible material, and is capable of being machined into any shape or thickness. Because floor fuel cell cushions 110 bear the weight of fuel cells 104, foam substrate 134 should have a compression strength and density to withstand the load of fuel cells 104 while not adding too much weight to the aircraft. In the illustrated embodiment, foam substrate 134 is a polyvinyl chloride, or PVC, closed cell foam that may be 100× stronger under compression than previously-used foams and have superior energy absorption properties so as to not collapse under the weight of fuel cells 104. In one non-limiting example, foam substrate 134 has a compression strength of between about 300 and about 500 pounds per square inch and preferably about 400 pounds per square inch. Foam substrate 134, however, may have a compression strength that is less than 300 pounds per square inch or greater than 500 pounds per square inch depending on the application, taking into account such factors as the size and weight of fuel cells 104. In another example, foam substrate 134 may have a density of between about five and about ten pounds per cubic foot and preferably about eight pounds per cubic foot. Foam substrate 134, however, may also have a density of less than five pounds per cubic foot or greater than ten pounds per cubic foot based on the application, taking into account such factors as the size and weight of fuel cells 104.

Foam substrate 134 is machined to fit between inner surface 108 of fuel cell receiving assembly 102 and fuel cells 104 to form a shaped foam substrate 136, as shown in FIG. 4B. Shaped foam substrate 136 may be machined to any shape or thickness. It will be appreciated by one of ordinary skill in the art that the tools that may be used to machine foam substrate 134 into shaped foam substrate 136 are numerous, and may include a band saw, groove bits, milling tools, a computer numerical control, or CNC, machine or other machining devices. After being machined, polyvinyl chloride foam maintains a smooth surface 138 on which a coating may be applied. A cushion coating 140 substantially covers shaped foam substrate 136 to form floor fuel cell cushion 110, as shown in FIG. 4C. Cushion coating 140 may be sprayed onto shaped foam substrate 136 such that floor fuel cell cushion 110 is substantially nonabsorbent of fuel. All or a portion of cushion coating 140 may be polyurethane to provide a thin and light coating for floor fuel cell cushion 110. Any type of polyurethane may be used in cushion coating 140, including primers, top coats, lacquers or other polyurethane coatings. Polyurethane provides cushion coating 140 with the flexibility to prevent cushion coating 140 from cracking when floor fuel cell cushion 110 is compressed, stretched, twisted or otherwise moved. Cushion coating 140 also provides floor fuel cell cushion 110 with a barrier that resists the absorption of fuel.

By using a high compression strength polyvinyl chloride foam, floor fuel cell cushions 110 provide structural support to prevent the displacement of fuel cells 104 while cushion coating 140 prevents floor fuel cell cushions 110 from absorbing fuel leaking from fuel cells 104. By preventing the collapse or sinking of fuel cells 104, floor fuel cell cushions 110 also prevent fluid interconnection lines 130a-130h from being severed by the rims of apertures 132a-132f, which might otherwise occur if fluid interconnection lines 130a-130h experience a large displacement. Floor fuel cell cushion 110 includes surfaces 142, 144, as best seen in FIG. 6. Surface 142 is machinably shaped to abut fuel cells 104 and surface 144 is machinably shaped to abut inner surface 108 of fuel cell receiving assembly 102. Floor fuel cell cushions 110 may also have a tapered shape to bias fuel in fuel cells 104 in a particular direction. In particular, floor fuel cell cushions 110 may be tapered from increasing to decreasing thickness from an edge 146 of floor 112 to a middle portion 148 of floor 112, as best seen in FIG. 2A, to bias the fuel in fuel cells 104 toward middle portion 148 of floor 112, where a fuel pump may be located.

Figure 5A:
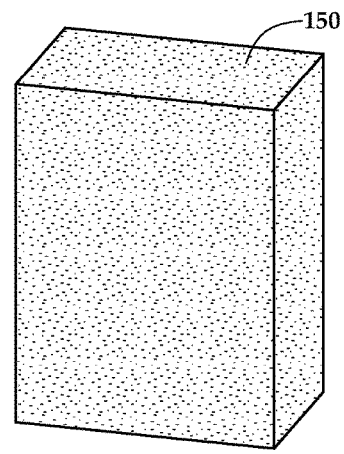
FIGS. 5A-5C are various views of the components of a wall fuel cell cushion in accordance with embodiments of the present disclosure.
Figure 5B:
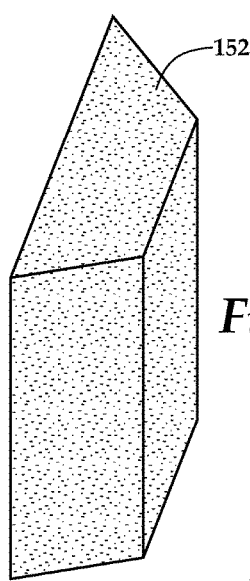
Figure 5C:
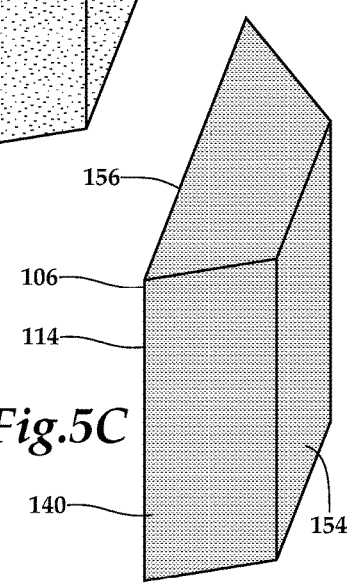

As shown in FIGS. 5A-5C, wall fuel cell cushion 114 may also have cushion coating 140 and be machinably shaped similar to floor fuel cell cushion 110. In some embodiments, because wall fuel cell cushions 114 do not have to bear the weight of fuel cells 104, wall fuel cell cushions 114 may include a foam substrate 150 that is lighter, less dense and/or has a lower compression strength than foam substrate 134 from which floor fuel cell cushions 110 are formed. In some embodiments, foam substrate 150 of wall fuel cell cushion 114 may be formed from polyethylene, polyolefin, Minicel® foam or a similar closed cell foam that is less dense or has a lower compression strength than polyvinyl chloride closed cell foam. In one non-limiting example, foam substrate 150 may have a density of between about one and about five pounds per cubic foot and preferably about two pounds per cubic foot and a compression strength of between about 10 and about 40 pounds per square inch and preferably about 20 pounds per square inch, although these figures may vary based on the application.

Similar to floor fuel cell cushion 110, foam substrate 150 of wall fuel cell cushion 114 may be machined to form shaped foam substrate 152. Shaped foam substrate 152 is machined to fit between fuel cells 104 and walls 116 of fuel cell receiving assembly 102. Surface 154 of wall fuel cell cushion 114 may be machinably shaped to abut fuel cells 104 and surface 156 of wall fuel cell cushion 114 may be machinably shaped to abut at least one of walls 116, including any protrusions therefrom, of fuel cell receiving assembly 102. Wall fuel cell cushions 114 may be specifically designed to cover protrusions, such as protrusion 118, angled surfaces or other portions of walls 116 that pose a wear or damage risk to fuel cells 104, thereby increasing the lifespan and minimizing the risk of puncturing fuel cells 104. Fuel cell cushions 106, including floor fuel cell cushions 110 and wall fuel cell cushions 114, may be adhered to inner surface 108, including any protrusions therefrom, using any technique or substance, such as by using glue, sealant or another adhesive. While in the illustrated embodiment, wall fuel cell cushions 114 are shown to be formed from a different foam substrate than floor fuel cell cushions 110, in some embodiments the foam substrates from which floor and wall fuel cell cushions 110, 114 are formed may be the same material, such as polyvinyl chloride foam.

FIG. 6 shows cushion coating 140 applied to shaped foam substrate 136 on a microscopic level. Although foam substrate 134 is formed from closed cell foam, the machining process exposes surface 138 of shaped foam substrate 136, which may include open cells and have an uneven surface on a microscopic level. Cushion coating 140 substantially fills the open cells on surface 138 of shaped foam substrate 136 to provide a smooth lightweight finish. In some embodiments, cushion coating 140 may have a minimum thickness 158 of approximately 0.005 inches to meet fuel resistance, design strength and energy absorption criteria. Cushion coating 140 may have thicknesses greater than 0.005 inches at other locations along surface 138. For example, cushion coating 140 may have a maximum thickness 160 of 0.01 inches. In other embodiments, cushion coating 140 may have a thickness of less than 0.005 inches or greater than 0.01 inches. Previous paddings for fuel cells have required heavy or thick sealants or paste adhesives, such as polysulfide, which are burdensome to be applied by hand. Cushion coating 140, on the other hand, may be sprayed onto a foam substrate, easing the application process. Previously-used sealants were also extremely heavy and could quadruple the weight of the underlying foam. Other previous paddings required foam to be wrapped in fiberglass and sealed, which poses weight disadvantages. Previous foams have also been pourable or molded foams that are not easily machined into shape. The illustrative embodiments address such shortcomings, among others, to provide an easily machinable foam substrate and a sprayable cushion coating that meets strength, weight, energy absorption, fuel resistance and other requirements.

Figure 7A:
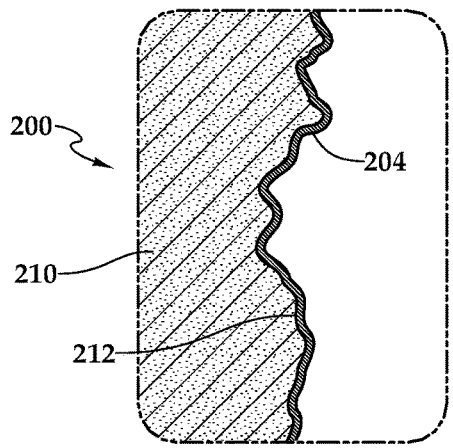
FIGS. 7A-7D are cross-sectional views of cushion coating layers being applied onto a shaped foam substrate in accordance with embodiments of the present disclosure.
Figure 7D:
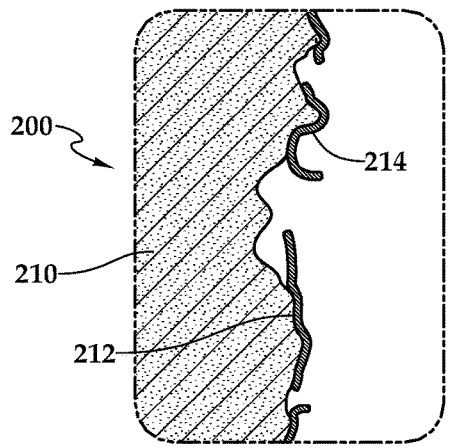
Figure 7B:
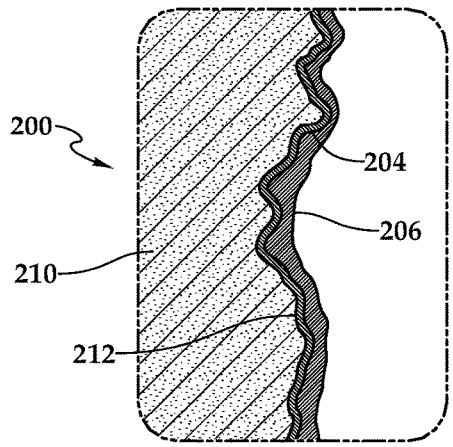
Figure 7C:
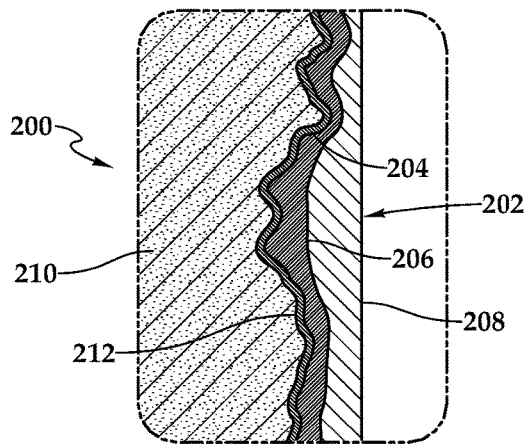

Referring to FIGS. 7A-7D in the drawings, a microscopic portion of a fuel cell cushion is schematically illustrated and generally designated 200. In the illustrated embodiment, cushion coating 202 is applied in three layers 204, 206, 208. As best seen in FIG. 7A, layer 204, which contacts shaped foam substrate 210, may be a thinned, or modified, layer compared to subsequent layers 206, 208. In particular, layer 204 may be a modified fuel resistant polyurethane coating that includes both polyurethane and a thinning agent such as xylene to lower the viscosity of layer 204 such that layer 204 conforms to the small contours of the open cells at surface 212 of shaped foam substrate 210, thereby enabling subsequent layers 206, 208 to be effectively applied. The failure to use a thinned cushion coating for layer 204, such as polyurethane thinned with xylene, may result in an overly viscous layer 214 that bridges the pores and open cells of surface 212 and is unable to conform to surface 212, which may cause popping or breaking while curing, as shown in FIG. 7D. In some embodiments, layer 204 may be thinned by up to 50%. In one non-limiting example, layer 204 has an approximately 2:1 ratio of polyurethane to xylene. Other thinning ratios and thinning agents may be used to form the thinned cushion coating of layer 204. Subsequent layers 206, 208, which are sprayed atop layer 204, may be pure polyurethane, although layers 206, 208 may contain substances in addition to or in place of polyurethane. When layer 208, the final layer, is applied or sprayed, fuel cell cushion 200 is left with a smooth lightweight finish that is resistant to fuel absorption and increases the strength of fuel cell cushion 200.

In other embodiments, each layer 204, 206, 208 may use a thinned cushion coating, such as the thinned cushion coating of polyurethane and xylene from which layer 204 is formed. While fuel cell cushion 200 includes three layers, fuel cell cushion 200 may meet strength, fuel resistance and other requirements with fewer layers, such as one or two layers. Fuel cell cushion 200 may also include four or more layers in certain applications. While previous paddings for fuel systems have required a burdensome application of fuel resistant sealant, the illustrative embodiments, through the use of polyurethane or other similar substances, allow cushion coating 202, including layers 204, 206, 208 thereof, to be sprayed onto shaped foam substrate 210, thereby allowing for an easier application of coating that meets fuel resistance requirements.

Referring to FIGS. 8A-8B in the drawings, stress versus strain graphs are shown to illustrate the effect that a cushion coating has on the fuel cell cushions of the illustrative embodiments. In particular, graph 300 illustrates the energy absorption, or cushioning effect, characteristics of a shaped foam substrate without a cushion coating. Graph 302 illustrates the energy absorption characteristics of a shaped foam substrate that includes cushion coating. The shaped foam substrates of both graphs 300 and 302 are formed from polyvinyl chloride closed cell foam. Energy absorption is determined by the area under each curve in graphs 300, 302. Area 304 under curve 306 in graph 302 is significantly larger than area 308 under curve 310 in graph 300. Thus, cushion coating significantly increases the cushioning effect of a fuel cell cushion, including when the underlying foam substrate is pressed beyond its compression strength 312. For example, the addition of a cushion coating as described in the illustrative embodiments may increase the energy absorbing capability of the underlying foam substrate by providing a 10 to 20 percent increase in strength while still maintaining the design strain levels. Cushion coating may also allow fuel cell cushions to flex, and not break, under high compression. The higher energy absorption provided by the cushion coating may be due to the stiffening of the fuel cell cushion surface caused by cushion coating.

Figure 9:
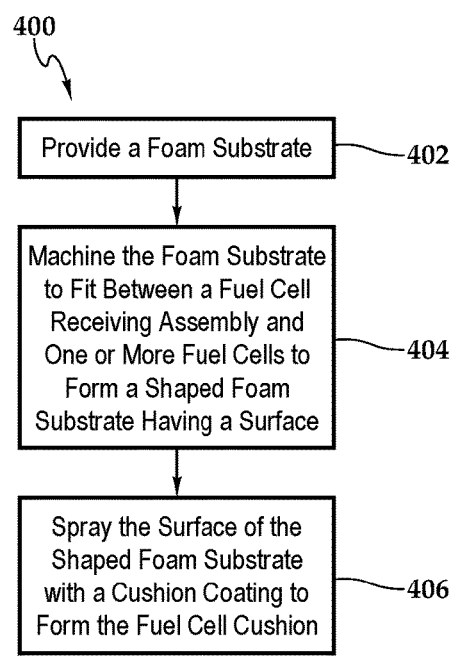
FIG. 9 is a flowchart of a method of manufacturing a fuel cell cushion for an aircraft fuel system in accordance with embodiments of the present disclosure.

Referring to FIG. 9 in the drawings, a method of manufacturing a fuel cell cushion for an aircraft fuel system is illustrated as flowchart 400. The method includes providing a foam substrate (step 402). The method includes machining the foam substrate to fit between a fuel cell receiving assembly and one or more fuel cells to form a shaped foam substrate having a surface (step 404). The method also includes spraying the surface of the shaped foam substrate with a cushion coating to form the fuel cell cushion (step 406). In some embodiments, step 406 may include spraying a plurality of layers of the cushion coating onto the surface of the shaped foam substrate. Such embodiments may include spraying a first, bottommost layer of thinned cushion coating onto the surface of the shaped foam substrate. The method may also include thinning the cushion coating up to 50% using a thinning agent, such as xylene, to form the thinned cushion coating.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. An aircraft fuel system comprising:
one or more fuel cells adapted to contain fuel;
a fuel cell receiving assembly having an inner surface adapted to receive the one or more fuel cells;
a shaped foam substrate machined from a foam substrate to fit between the inner surface of the fuel cell receiving assembly and the one or more fuel cells; and
a cushion coating substantially covering the shaped foam substrate to form a fuel cell cushion, the cushion coating sprayable onto the shaped foam substrate such that the fuel cell cushion is substantially nonabsorbent of fuel, the fuel cell cushion interposable between the inner surface of the fuel cell receiving assembly and the one or more fuel cells to cushion the one or more fuel cells from damage.

2. The aircraft fuel system as recited in claim 1 wherein the inner surface of the fuel cell receiving assembly further comprises a floor and a wall; and
wherein the fuel cell cushion further comprises a plurality of fuel cell cushions including a floor fuel cell cushion and a wall fuel cell cushion, the floor fuel cell cushion disposed on the floor of the fuel cell receiving assembly, the wall fuel cell cushion disposed on the wall of the fuel cell receiving assembly.

3. The aircraft fuel system as recited in claim 2 wherein the shaped foam substrate of the floor fuel cell cushion has a higher compression strength and a higher density than the shaped foam substrate of the wall fuel cell cushion.

4. The aircraft fuel system as recited in claim 2 wherein the wall of the fuel cell receiving assembly further comprises at least one protrusion; and
wherein the wall fuel cell cushion at least partially covers the at least one protrusion to cushion the one or more fuel cells from damage from the at least one protrusion.

5. The aircraft fuel system as recited in claim 2 wherein the floor of the fuel cell receiving assembly further comprises an edge at least partially surrounding a middle portion; and
wherein the floor fuel cell cushion is tapered from increasing to decreasing thickness from the edge of the floor to the middle portion of the floor to bias the fuel in the one or more fuel cells to flow toward the middle portion of the floor.

6. The aircraft fuel system as recited in claim 1 wherein the foam substrate further comprises a closed cell foam.

7. The aircraft fuel system as recited in claim 1 wherein the foam substrate further comprises polyvinyl chloride.

8. The aircraft fuel system as recited in claim 1 wherein the foam substrate has a compression strength between about 300 and about 500 pounds per square inch.

9. The aircraft fuel system as recited in claim 1 wherein the foam substrate has a density of between about 5 and about 10 pounds per cubic foot.

10. The aircraft fuel system as recited in claim 1 wherein the cushion coating further comprises polyurethane.

11. The aircraft fuel system as recited in claim 1 wherein the cushion coating has a thickness of between about 0.005 and 0.01 inches.

12. The aircraft fuel system as recited in claim 1 wherein the cushion coating further comprises a plurality of layers and wherein a first layer contacting the shaped foam substrate further comprises a thinned cushion coating.

13. The aircraft fuel system as recited in claim 12 wherein the thinned cushion coating further comprises polyurethane thinned with xylene in a ratio of approximately 2:1.

14. An aircraft comprising:
a fuselage;
a fuel cell receiving assembly coupled to the fuselage, the fuel cell receiving assembly having an inner surface;
one or more fuel cells adapted to contain fuel, the fuel cell receiving assembly adapted to receive the one or more fuel cells;
a shaped foam substrate machined from a foam substrate to fit between the inner surface of the fuel cell receiving assembly and the one or more fuel cells; and
a cushion coating substantially covering the shaped foam substrate to form a fuel cell cushion, the cushion coating sprayable onto the shaped foam substrate such that the fuel cell cushion is substantially nonabsorbent of fuel, the fuel cell cushion interposable between the inner surface of the fuel cell receiving assembly and the one or more fuel cells to cushion the one or more fuel cells from damage.

15. The aircraft as recited in claim 14 wherein the one or more fuel cells further comprise one or more fuel bags.

16. The aircraft as recited in claim 14 wherein the inner surface of the fuel cell receiving assembly forms a plurality of compartments;
wherein the one or more fuel cells further comprise a plurality of fuel cells; and
wherein each of the plurality of compartments is adapted to receive at least one of the plurality of fuel cells.

17. The aircraft as recited in claim 14 wherein the one or more fuel cells further comprise a plurality of fuel cells including first and second fuel cells, further comprising:
a fluid interconnection line coupled between the first and second fuel cells to provide fluid communication between the first and second fuel cells;
wherein the first and second fuel cells are separated by a wall, the wall forming an aperture having a rim;
wherein the fluid interconnection line passes through the aperture; and
wherein the fuel cell cushion provides support underneath the first and second fuel cells to prevent severing of the fluid interconnection line by the rim of the aperture.

18. A method of manufacturing a fuel cell cushion for an aircraft fuel system comprising:
providing a foam substrate;
machining the foam substrate to fit between a fuel cell receiving assembly and one or more fuel cells to form a shaped foam substrate having a surface; and
spraying the surface of the shaped foam substrate with a cushion coating to form the fuel cell cushion, the fuel cell cushion substantially nonabsorbent of fuel, the fuel cell cushion interposable between the fuel cell receiving assembly and the one or more fuel cells to cushion the one or more fuel cells from damage.

19. The method as recited in claim 18 wherein spraying the surface of the shaped foam substrate with the cushion coating to form the fuel cell cushion further comprises spraying a plurality of layers of the cushion coating onto the surface of the shaped foam substrate.

20. The method as recited in claim 19 wherein spraying the plurality of layers of the cushion coating onto the surface of the shaped foam substrate further comprises spraying a first, bottommost layer of thinned cushion coating onto the surface of the shaped foam substrate.

* * * * *